United States Patent [19]
Cimini et al.

[11] Patent Number: 5,914,933
[45] Date of Patent: Jun. 22, 1999

[54] CLUSTERED OFDM COMMUNICATION SYSTEM

[75] Inventors: Leonard Joseph Cimini, Howell, N.J.; Babak Daneshrad, Los Angeles, Calif.; Nelson Ray Sollenberger, Tinton Falls, N.J.

[73] Assignee: Lucent Technologies Inc., Murray Hill, N.J.

[21] Appl. No.: 08/730,430

[22] Filed: Oct. 15, 1996

Related U.S. Application Data

[60] Provisional application No. 60/011,601, Mar. 8, 1996.

[51] Int. Cl.⁶ .................................................. H04L 27/26
[52] U.S. Cl. ........................... 370/208; 370/210; 370/343; 375/299; 375/347
[58] Field of Search .................................... 370/203, 206, 370/208, 491, 210, 482, 204, 480, 343, 484; 375/261, 364, 344, 355, 347, 299; 455/101–104

[56] References Cited

U.S. PATENT DOCUMENTS

| | | | |
|---|---|---|---|
| 5,416,767 | 5/1995 | Koppelaar et al. | 370/206 |
| 5,507,035 | 4/1996 | Bantz et al. | 455/133 |
| 5,548,582 | 8/1996 | Brajal et al. | 370/206 |
| 5,602,835 | 2/1997 | Seki et al. | 370/206 |
| 5,610,908 | 3/1997 | Shelswell et al. | 370/210 |
| 5,675,572 | 10/1997 | Hidejima et al. | 370/206 |
| 5,687,165 | 11/1997 | Daffara et al. | 370/208 |

OTHER PUBLICATIONS

Casas et al, "OFDM for Data Communication Over Mobile Radio FM Channels" IEEE Transactions on Communications, vol. 39, No. 5, pp. 783–793, May 1991.

Sakakura et al., "Pre–Diversity using Coding, Multi–carriers and Multi–antennas", paper presented at 1995 Fourth IEEE International Conference on Universal Personal Communications, pp. 605–609. (Tokyo, Japan, Nov. 1995).

Leonard J. Cimini, Jr., "Performance Studies for High–Speed Indoor Wireless Communications," Wireless Personal Communications 2: pp. 67–85 (1995).

Primary Examiner—Chau Nguyen

[57] ABSTRACT

A multicarrier communication system for wireless transmission of blocks of data having a plurality of digital data symbols in each block. The communication system includes a device for distributing the digital data symbols in each block over a plurality of clusters, each of the clusters receiving one or more digital data symbols. The digital data symbols are encoded in each of the cluster; and modulated in each cluster to produce a signal capable of being transmitted over the sub-channels associated with each cluster. A transmitter thereafter transmits the modulated signal over the sub-channels. By distributing the modulated signal over a plurality of clusters, overall peak-to-average power (PAP) ratio is reduced during transmission and transmitter diversity is improved.

42 Claims, 7 Drawing Sheets

CLUSTERED OFDM COMMUNICATION SYSTEM

RELATED APPLICATIONS

This application claims the benefit of provisional U.S. patent application Ser. No. 60/011,601, filed Mar. 8, 1996.

FIELD OF INVENTION

The present invention relates generally to communication systems and more specifically, to a clustered multicarrier wireless communication system.

DESCRIPTION OF THE PRIOR ART

In a radio environment, multipath delay spread can severely limit the maximum transmission rate. Multicarrier transmission such as OFDM (orthogonal frequency division multiplexing) and single-carrier systems with equalization are often proposed as techniques for overcoming these limitations. However, both techniques present practical difficulties which can restrict their application.

For instance, in a wireless LAN/ATM application, the desire to transmit short packets requires fast start-up, especially in a peer-to-peer architectures and this requirement could limit the usefulness of an equalized system, especially one using the LMS ("least mean square") algorithm to acquire the equalizer coefficients, because of the typically long convergence time of this algorithm. Algorithms which converge faster, such as RLS ("recursive least square"), may be too complex for applications requiring transmission rates of 20 Mb/s or more. On the other hand, a multicarrier transmission scheme has, the advantage of requiring very little training since equalization can usually be avoided. However, a multicarrier signal with a large number of sub-channels is burdened with a large peak-to-average power ratio. Hence, highly linear (and inefficient) amplifiers must be used to avoid distortion and spectral spreading. In addition, with either approach, a technique which can exploit the potential of diversity without requiring multiple receivers is desirable.

SUMMARY OF THE INVENTION

The invention improves the performance of a wireless data communication system by employing a clustered approach to a multicarrier modulation technique.

According to a preferred embodiment of the invention, there is provided a multicarrier communication system for wireless transmission of blocks of data having a plurality of digital data symbols in each block, the system comprising: a device for distributing the plurality of digital data symbols in each block over a plurality of clusters, each of the plurality of clusters capable of receiving one or more digital data symbols; a device for encoding the one or more digital data symbols in each of the plurality of clusters; a device for modulating the encoded one or more digital data symbols in each cluster to produce a modulated signal capable of being transmitted over sub-channels associated with each respective cluster; and a transmitter for transmitting the modulated signal over the sub-channels.

Advantageously, by distributing the modulated signal over a plurality of clusters, the overall peak-to-average power (PAP) ratio is reduced during signal transmission and transmitter diversity is improved.

A non-linear coding technique may be implemented by the encoding device to encode the one or more symbols in each cluster to reduce the peak-to-average power ratio.

The clustered multicarrier communication system includes a receiver for receiving and demodulating the modulated signal. The system further includes a device located at the receiver for measuring frequency response of each sub-channel of the plurality of clusters, and for providing feedback representing a frequency response characteristic of each transmission sub-channel to the transmitter. The transmitter includes a device for switching each of the one or more symbols to be transmitted to an optimum transmission sub-channel according to the frequency response of the optimum transmission sub-channel.

The clustered multicarrier communication system further includes a device for synchronizing data to enable simultaneous transmission of data over all the sub-channels of the plurality of clusters to effect simultaneous transmission of data over an entire transmission bandwidth.

The device for modulating the encoded one or more digital data symbols includes a device for providing OFDM modulation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1A:
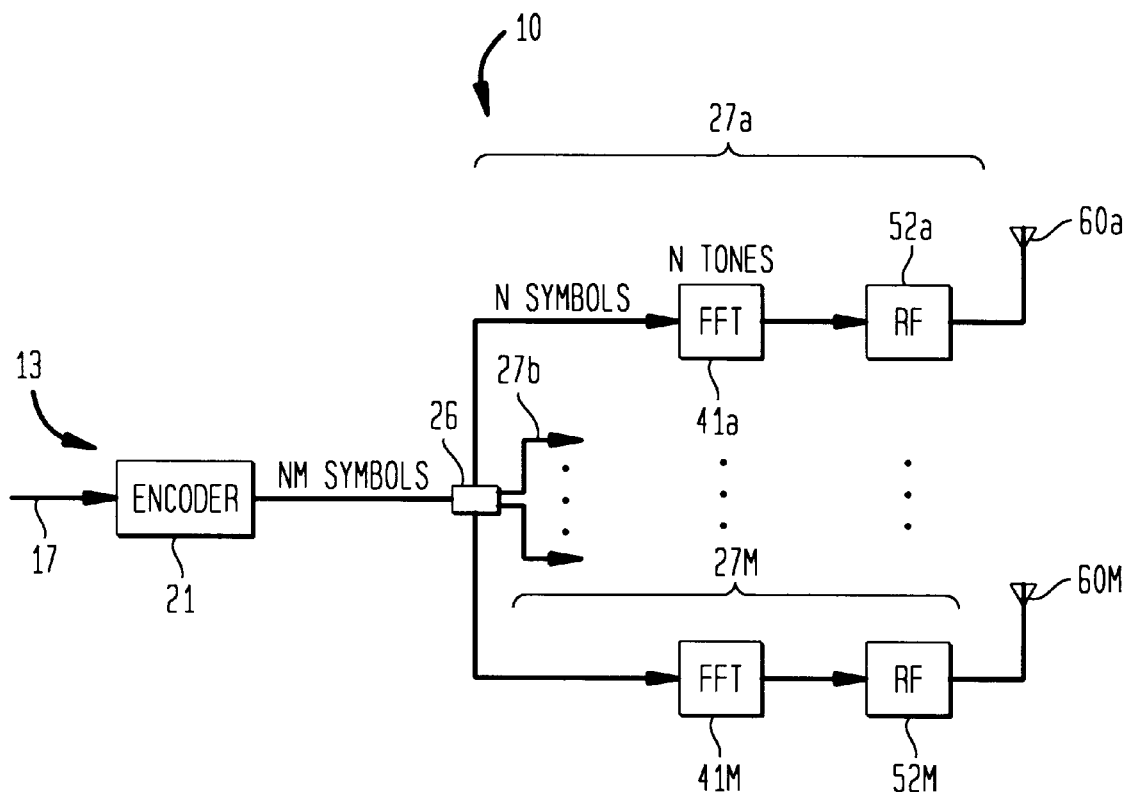
FIGS. 1A and 1B are general block diagrams illustrating respectively the transmitter and receiver portions of the improved OFDM communication system of the invention.
Figure 1B:
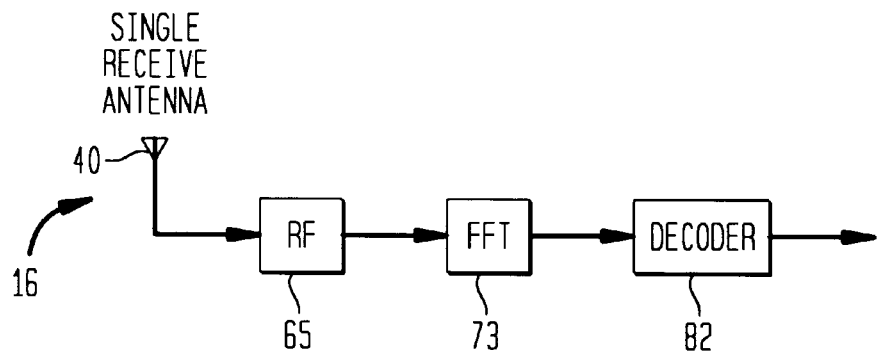

The clustered wireless communication system 10 includes a transmitter portion 13 shown conceptually in FIG. 1A, and a receiver portion 16 shown conceptually in FIG. 1B. In the transmitter portion, an input digital data stream of information 17 is input at a predetermined data rate, 1/T, to an encoder 21 to allow for error/erasure correction in the receiver portion 16. As shown in FIG. 1A, the encoder 21 (and modulator) produces a multicarrier (or multitone) signal 19 comprising a quantity of NM symbols that is demultiplexed by demultiplexer circuit 26 to separate the serial encoded signal 19 into M blocks or clusters 27a, . . . 27M with each cluster being transmitted in parallel over a separate sub-channel. Preferably, each sub-channel is of narrow bandwidth for carrying N tones separated in frequency by 1/NT. For each cluster, Orthogonal Frequency Division Multiplexing (OFDM) is implemented by respective Fast Fourier Transform devices 41a, . . . , 41M for converting each digital stream into N tones for transmission over the respective sub-channel. In each of the M clusters, the N tones are carrier modulated and amplified by devices 52a, . . . , 52M for transmission over respective separate and ideally independent antennas 60a, . . . , 60M.

At the receiver portion 16 shown in FIG. 1B, a single receive antenna 40 and demodulator devices 65 and 73 are used for demodulating the OFDM signal using conventional techniques such as coherent or differential detection. Decoder 82 is used as the erasure/error correction decoder. It is understood that the receiver portion may consist of multiple receivers, and, that the system 10 may be provided with full duplex transmission capability.

The clustered OFDM communication technique is advantageous in that minimal or no training is required, enabling short packets to be accommodated more efficiently in peer-to-peer architectures. The usual benefit of using OFDM in a frequency-selective environment is that by dividing the transmitted bandwidth into many narrow sub-channels M which are transmitted in parallel, the effects of delay spread are minimized, eliminating the need for an equalizer. Additionally, the peak-to-average power ratio is reduced since there are fewer tones transmitted per transmitter resulting in less spectral spreading when subjected to a non-linearity and/or smaller required power amplifier backoff, or equivalently, better power efficiency. The average power for an individual amplifier is also reduced as the amplifier requirements are distributed across the M clusters. The proposed architecture allows for a flexible, parallel implementation, with lower complexity than equalizer approaches.

Figure 2:
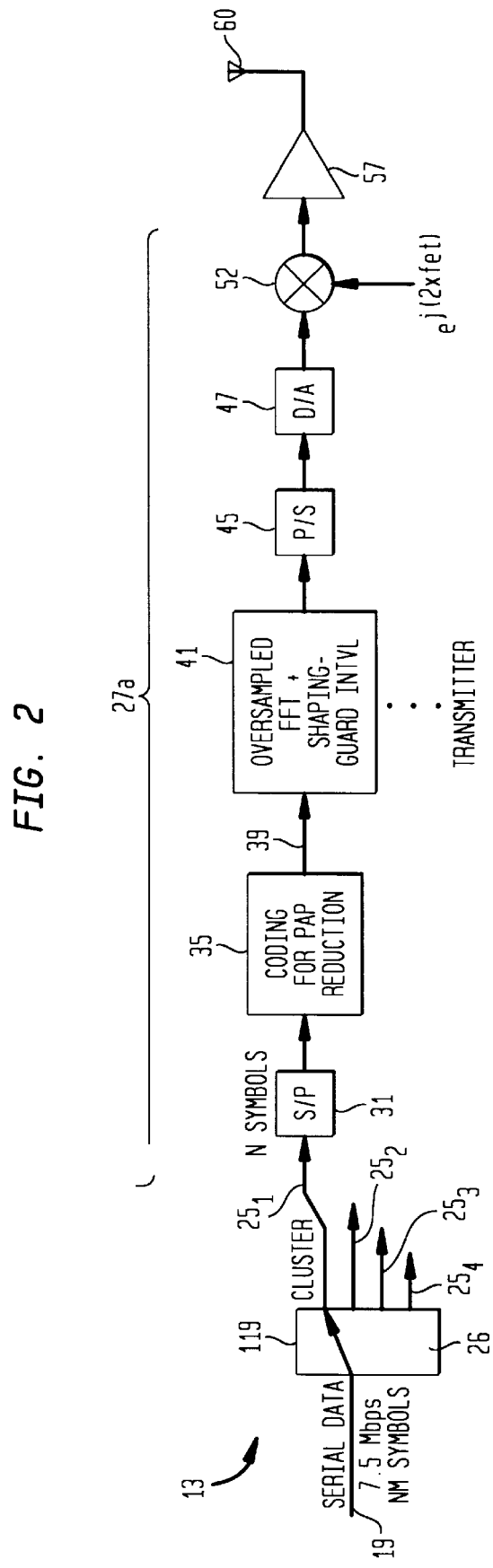
FIG. 2 is a detailed block diagram illustrating one transmitter portion of the improved OFDM communication system of the invention.

A more detailed block diagram of the transmitter portion 13 of the improved clustered wireless communication system 10 is shown in FIG. 2. In FIG. 2, the input digital data stream 19 that has been previously encoded using conventional techniques, e.g., Reed-Solomon coding, to allow for eventual error/erasure correction at the receiver. The input encoded digital data stream 19 is represented as a multitone signal comprising a quantity of NM symbols, each symbol having a period of T, and a symbol rate 1/T which is usually limited by the amount of multipath fading as experimentally realized in the particular environment, e.g., indoor or outdoor, that the communication system is operating. It is understood that the coding is provided across all frequencies of the multitone signal, with Reed-Solomon coding being an example coding technique. The encoded digital data stream 19 is then input to a demultiplexer or equivalent circuit 26 that separates the serial encoded signal 19 into M parallel signals, 25a, . . . , 25M, for transmission over separate M blocks or clusters 27a, . . . , 27M, with each cluster constituting a separate sub-channel. In the diagram shown in FIG. 2, the input digital data stream multitone signal 19 comprises a quantity of NM tones (e.g., NM=28) for distribution over M clusters (M=4), with each cluster 27a transmitting N tones (N=7). Each sub-channel 27a, . . . 27M is a narrow bandwidth channel carrying N tones for transmission at a sub-channel symbol rate of 1/NT. Ideally, the bandwidth of the sub-channels will be narrow enough so there is no ISI and that the only effect of multipath is flat fading in each sub-channel. As will be explained, the clustering of tones in this manner has several advantages. First, the peak-to-average power ("PAP") ratio is reduced by 10 log(M); second, the size of the table needed for non-linear coding as will be explained below, is significantly reduced; and third, the transmission of different clusters on separate antennas results in independent fading on each cluster. With the use of error correction coding across all frequencies and a minimal amount of information from the receiver regarding the relative performance of the clusters, the clustering approach can result in an effective means for realizing transmit diversity.

In the clustered OFDM communication system, the input digital data stream 25a, . . . , 25M carrying N tones for transmission over each respective M clusters 27a, . . . 27M is subject to Orthogonal Frequency Division Multiplexing (OFDM). As shown in cluster 27a of FIG. 2, the digital data stream 25a is input to a serial-to-parallel converter 31 that produces a data word in parallel that is suitable for coding in the PAP reduction coder 35 for the purposes of PAP reduction. Preferably, the PAP reduction coder 35 implements a non-linear code or mapping of signal 25a based on PAP-ROM table lookup techniques which guarantees the PAP ratio reduction. As an example, a sequence of seven (7) tones (14 bits each) may be mapped into eight 8 tones (16 bits each) requiring 214 16-bit entries in the transmitter PAP-ROM 35. As seventy-five percent (75%) of the PAP-ROM table look-up entries may be avoided, in this instance, then those table entries forming large power peaks may be avoided. It should be understood that other mathematical coding and decoding techniques such as Complementary Golay sequences may be utilized instead of PAP reduction look-up tables. Having accomplished the non-linear mapping, the resulting non-linear coded signal 39 is then modulated onto the tones (subcarriers) by performing a Discrete Fourier Transform implemented by DFT element 41, shown in cluster 27a in FIG. 2. As will be explained herein, the receiver portion 16 of the OFDM communication system is capable of receiving pilot tones from the transmitter to measure frequency response characteristics of particular transmission sub-channels. The receiver will provide the transmitter portion with sub-channel frequency response information in the form of a feedback signal, to enable optimal switching of particular tones to a particular sub-channels (in a particular cluster) having a matching frequency response characteristic.

The OFDM multicarrier signal generated in each of the M clusters is then multiplexed into serial form as shown by the parallel to serial converter 45, converted to analog form by D/A converter 47, carrier modulated by RF mixer 52, amplified by RF amplifier 57, and transmitted over a separate and ideally independent antenna 60.

Figure 3:
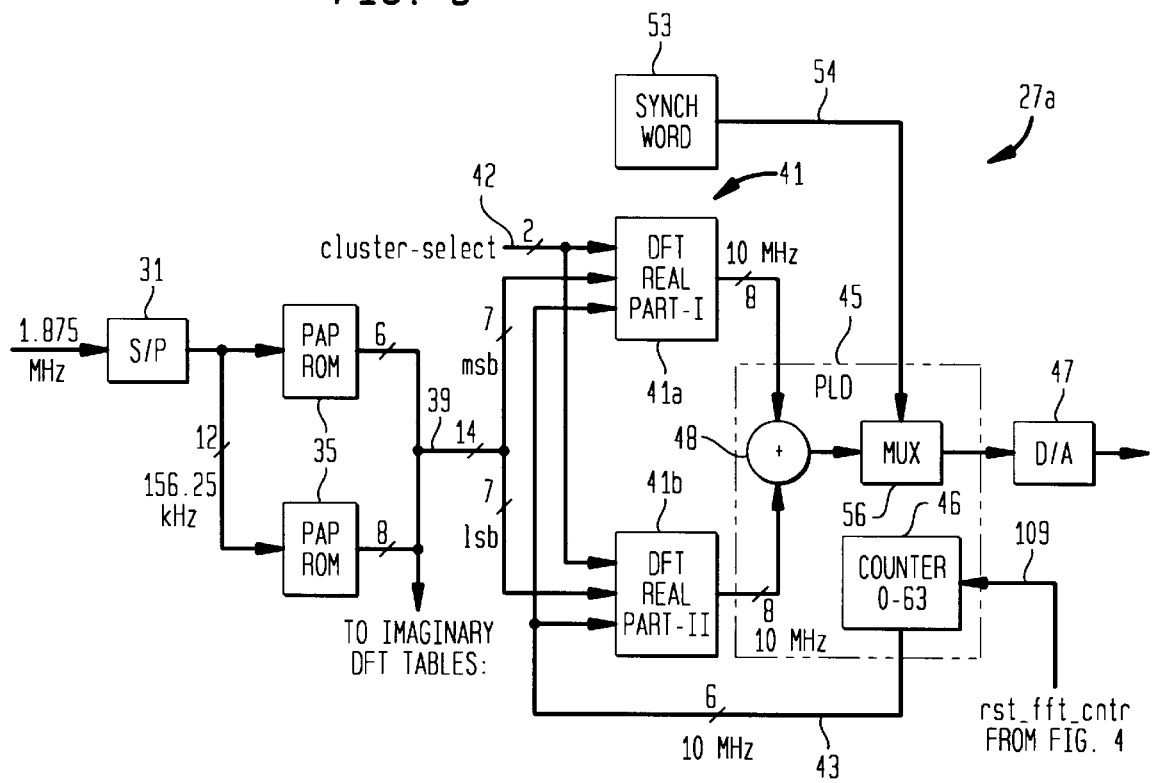
FIG. 3 is a schematic block diagram illustrating a single cluster of the transmitter.
Figure 4:
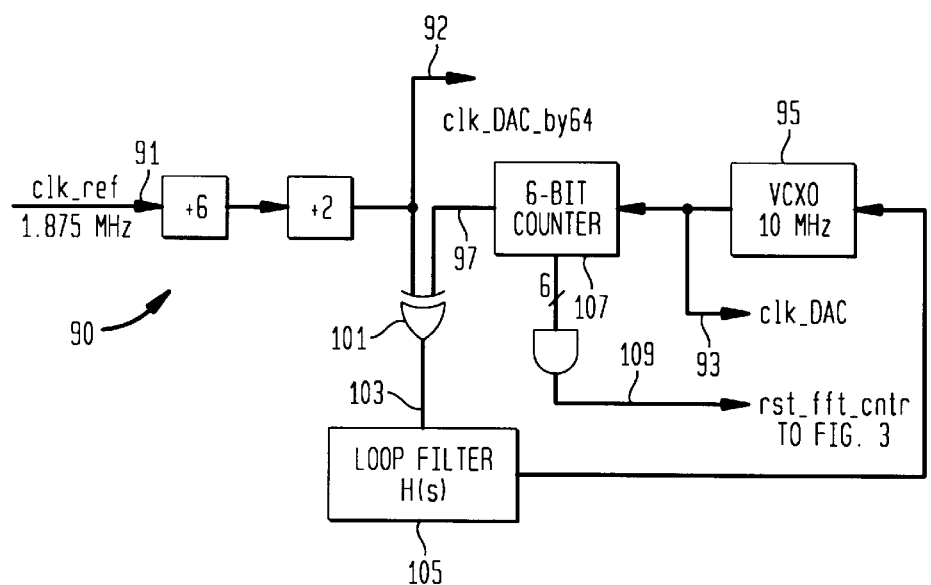
FIG. 4 is a schematic block diagram of a clock generation circuit for the transmitter.

FIG. 3 illustrates a schematic diagram of a non-limiting, example embodiment of a datapath for single transmit cluster 27a of the transmitter portion 13 of FIG. 2, that is simple to implement with a minimization of hardware and complexity. The system operates at a maximum clock rate of 10 MHz and requires three different clock signals which are related to each other through the implementation of PLL/ clock generation circuit such as shown in FIG. 4, described below. Although the components used in the embodiment were chosen to support data rates of up to 22 Mbps, it should be understood that higher speed versions of the transmit cluster can be realized depending upon the components and the printed circuit board fabrication technique used.

In the non-limiting example embodiment of a single transmit cluster 27a shown in FIG. 3, the serial data bit stream input to the cluster is at a rate, e.g., 1.875 MHz, which would imply that the digital data stream input to the transmitter demultiplexer 26 (FIG. 2) was at a bit rate equal to 7.5 Mbps for distribution to each of the four clusters (M=4) at the same rate (1.875 Mbps/cluster). In each cluster, the serial-to-parallel converter 31 produces a 12-bit word at a reduced rate of 156.25 kHz. In a conventional OFDM system, this 12-bit word could have been used to modulate 6 complex tones, however, in the improved OFDM system, the 6 tones are coded (mapped) into 7 complex tones for purposes of PAP reduction. A non-linear code is used for this purpose which guarantees the PAP ratio of the 7 tones to be no more than 3.2 dB. Due to its non-linear nature, the PAP coding needs to be implemented via table lookup and in the embodiment shown in FIG. 3, a 4 K×14 ROM based table 35 and lookup technique is provided to implement the non-linear mapping. The 14-bit PAP-ROM output word 39 represents the encoded complex symbols of a QPSK constellation, which modulate a cluster of seven (7) complex tones. It should be noted that the speed with which these PAP ROM tables are accessed is equal to the speed with which the OFDM blocks are generated and in the implementation shown in FIG. 3, this rate is 156.25 kHz.

In OFDM, modulation onto the tones (subcarriers) is performed by way of a Discrete Fourier Transform implemented by (DFT). Given a desire to transmit M (M=4) clusters of N (N=7) tones each, the modulator on each section must realize the following equation (1):

$$Y_m(k) = \sum_{n=0}^{6} (x_{2n} + jx_{2n+1})e^{-j\frac{2\pi k(n+7m)}{28}\frac{1}{2}} \quad \begin{array}{l} k = 0, \ldots, 55 \\ m = 0, 1, 2, 3 \end{array} \quad (1)$$

where "m" is the cluster number, $Y_m(k)$ is the output sequence which is fed to the D/A for transmission and $x_n$ represents the $n^{th}$ bit of the 14-bit word appearing at the output of the PAP ROM 35. In the embodiment shown in FIG. 3, the even bits were assigned to the real part of the symbol and the odd bits were assigned to the imaginary part. A closer look at equation (1) reveals that the output sequence consists of 56 complex samples, twice of what is required for a typical 28-point DFT. This is due to the desire to oversample the DFT output sequence by a factor of two, which requires the one-half (½) multiplier introduced into the exponential function in equation (1). The oversampling guarantees a separation of $f_s/2$ between the baseband signal and the first image of the signal output from the D/A converter 47. The separation results in a significant relaxation of the specification for the image canceling lowpass filters following the D/A converter 47.

As the OFDM transmit block typically consists of an original N-point block (N=56 in the embodiment of FIG. 3), a cyclic prefix or extension block, and possibly a guard interval block, a total of eight (8) samples were allowed for the combination of the cyclic prefix and the guard interval and, in the particular implementation described, the contents of these eight samples may be freely chosen. Consequently, for every 14-bit word that appears at the output of the PAP ROMs 35 (FIG. 3), sixty-four (64) samples need to be read from the DFT ROMs 41 and presented to the D/A converter 47. These 64 samples constitute a complete OFDM symbol (block). In the embodiment shown in FIG. 3, the cyclic prefixing, windowing, and the DFT operation was consolidated into a ROM lookup table 41 in order to avoid the use of elaborate and costly signal processing ICs and to provide a flexible mechanism in which the relative size of the cyclic prefix and guard intervals of the OFDM symbol can be varied. The implementation of the ex ample embodiment shown in FIG. 3, also enable s the user to realize any windowing function on the OFDM symbol.

In the embodiment described, the DFT ROM 41 has a total of twenty (20) input address bits, fourteen (14) from the PAP ROM 35 output signal 39 and six (6) bits for the output signal 43 of a 64-bit counter 46 that reads off the 64 samples of the OFDM symbol. This results in a total ROM address space of one million words and a ROM access speed equal to a preferred D/A converter rate of 10 MHz. In order to avoid the use of high-end memory modules when higher D/A data rates (e.g. 30 MHz) are implemented, the DFT lookup table 41 is partitioned into two DFT ROMS, 41a,b, each for modulating N/2 complex tones, e.g., 3.5 tones in the embodiment shown in FIG. 3. Taking into account sampling quantization and the resulting in-band interference, an 8-bit representation was used for the DFT samples stored in each of the two DFT ROMS. The outputs of these ROMs 41a and 41b are then added together by adder element 48 in a programmable logic device 45 ("PLD") to realize the desired total of N tones for the channel, e.g., seven (7) tones. Thus, partitioning of the DFT task enables the replacement of a 1 Mbyte ROM with a pair of 8 kByte ROMS.

To enable cluster switching, i.e., to enable each transmitter cluster board to transmit tones over any one of the four clusters, the two 8 kbyte DFT ROMs 41a,41b, may be replaced by two 32 kbyte ROMs having two additional address lines 42 that enable selection between one of the four different clusters as shown in FIG. 3.

As further illustrated in the example embodiment of the transmit cluster shown in FIG. 3, a synch-word ROM 53 is provided that contains a synchronization word 56 that is sent at the beginning of each packet (a packet consists of many OFDM symbols) to enable the receiver to identify the start of the incoming packet of OFDM symbols. In the embodiment of FIG. 3, the synchronization word is stored in a separate ROM 53 and its samples are sent to the D/A converter by way of the multiplexer device 56 built into PLD 45.

The operation of the datapaths described in connection with the transmit cluster 27a of FIG. 3 is governed by three clocks and a control signal. In the schematic diagram of the clock generation circuit 90 shown in FIG. 4, it is observed that the serial data coming into the cluster is clocked at a 1.875 MHz rate, that is a clock reference signal 91 is input at the rate that data is input to each cluster. The clock reference signal 91 is then be divided by twelve (12) to provide the clock signal 92 at, e.g., 156.25 kHz, for timing operation of the serial-to-parallel converter 31, as well as the PAP ROM 35 of transmit cluster 27a. As shown in FIG. 4, a voltage controlled oscillator (VCXO) 95 centered at 10 MHz is used to generate the clock signal 93 for the D/A converter. As described above, for each 14-bit word produced by the PAP ROM 35, sixty-four (64) samples have to be read from the DFT ROMs 41a,b and processed through to the D/A converter 47 which is being clocked at 10 MHz (64×156.25 kHz) with the D/A clock signal 93. To provide for the sampling of the DFT ROMs, the D/A clock signal 93 is input to a six-bit counter 107 to divide the D/A clock signal 93 in frequency by sixty-four (64) and provide a divide-by-64 D/A clock signal 97 that is phase locked with serial to parallel converter clock signal 92. A simple exclusive-OR gate 101 is used as a phase detector and the phase error signal 103 output from the exclusive-OR gate 101 is filtered by an active loop filter 105 having a transfer function H(s)=(R₂Cs+I)/R₁Cs before being fed-back to the VCXO oscillator 95. It is understood that the transfer function H(s) for the active loop filter 105 was chosen for the particular components and frequencies used in the cluster transmitter shown in FIG. 3, and may change depending upon the frequencies and circuit designs used.

In addition to synchronizing the frequency of the three system clocks 91, 92 and 93, it is also important to synchronize the 6-bit counters that generate the divide-by-64 D/A clock signal 97 and the 6-bit counter 46 that generates the 6 LSB's of the DFT addresses. As the DFT address counters 46 (FIG. 3) are started immediately upon system start-up and the divide-by-64 D/A clock signal 97 signal undergoes some frequency fluctuations until the PLL is locked, synchronization is required to ensure that the relative position of these two 6-bit counters are the same in steady state. In order to guarantee synchronization, a reset control signal 109 signal is generated by sensing a sixty-two (62) count and delaying the signal by one D/A clock period 93. This signal 109 is then sent to the DFT address counter which undergoes a synchronous reset at the next rising edge of D/A clock 93.

The complete clustered-OFDM transmitter illustrated in FIG. 2 and described in detail with respect to FIG. 3, would require four transmitter boards, and a single clock generation board which can be realized using inexpensive, off-the-shelf ROMs and PLDs. With a modular approach in providing separate clock and control circuitry, the capability is provided for varying the number of clusters at will so that any number of transmit cluster board s can be plugged into the OFDM communication system.

As the clustering approach applies only to the transmitter, the receiver must implement a complete N-point DFT to recover the data. However, with the exception of this single processing element, the remainder of the receiver can be realized using inexpensive, off-the-shelf ROMs and PLDs in the same manner as the transmitter.

Figure 5:
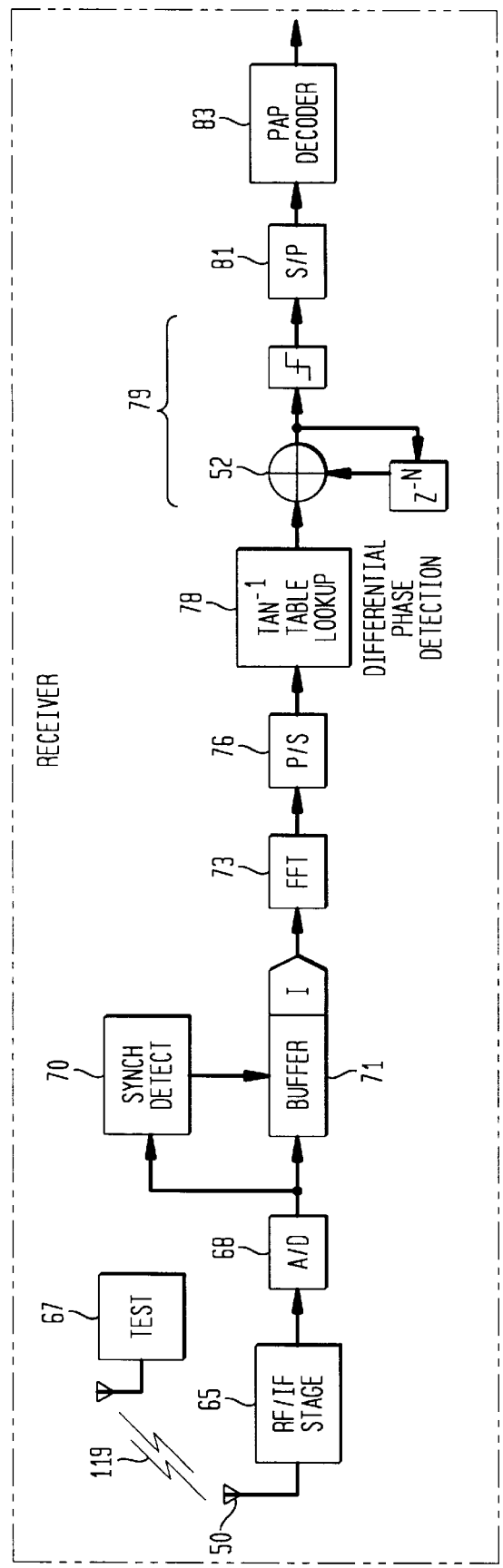
FIG. 5 is a detailed block diagram illustrating the receiver portion of the improved OFDM communication system of the invention.

A non-limiting, example embodiment for implementing the single receiver portion 16 of the OFDM communication system is illustrated in FIG. 5. As shown in FIG. 5, a single receive antenna 50 receives the OFDM signal transmitted by clusters 27a, . . . , 27M and an RF demodulator 65 is used to demodulate the received signal. The demodulated signal is then converted into digital form by A/D converter 68 and signal processing such as coherent or differential detection is implemented to recover the data. To implement a preferred method of differential detection, a synchronous detector 70 and buffer 71 elements provide the parallel digital words to a Fast Fourier Transform element 73, the output of which is converted back into serial form by parallel to serial converter element 76. Using a ROM table phase look-up table 78 and associated phase detect circuitry 79, the serial data is differentially phase detected. Further serial to parallel transformation of the digital signal is performed by serial to parallel converter 81, and PAP non-linear decoder 83 is used to obtain the original data. Using the PAP non-linear coder having $2^{14}$ described above in connection with FIG. 2, the receiver PAP non-linear decoder 83 will contain $2^{16}$ 14-bit entries. It should be understood that suitable error/erasure correction (e.g., Reed-Solomon) decoding is performed (not shown).

The performance of the clustered OFDM communication system can be improved (that is, more bit rate achieved for a given bandwidth) by optimally assigning a given cluster to a particular antenna, i.e., providing cluster switching. First, pilot tones are sent over each cluster 27a, . . . , 27M and, at the expense of receiver training, the receiver measures the frequency response of each sub-channel associated with each of the clusters. As shown in FIG. 5, the receiver portion 16 includes a device 67 for analyzing the frequency response of the sub-channels. The frequency response information of the sub-channels is provided back to the transmitter in the form of feedback signal 119 shown in FIGS. 2 and 5. Thus, it may be determined which tones are bad and a bad cluster may be switched to a different antenna by appropriate circuitry such as demultiplexer 26 (FIG. 2) and cluster select address lines 42 (FIG. 3) which enable the dynamic assignment of clusters to antennas, resulting in a significant improvement in the outage performance. In particular, for a 20-dB fade margin, cluster switching provides more than two orders of magnitude improvement in the outage. Alternatively, for a fixed outage of 1%, cluster switching can provide about a 10 dB reduction in the required fading margin. Table 1, shows the a performance comparison between systems implementing cluster switching (adaptive) versus a system without.

TABLE I

| P | $P_{out}$ (Fixed) | $P_{out}$ (Adaptive) |
|---|---|---|
| 0.9000 | $3.44 \times 10^{-1}$ | $3.70 \times 10^{-2}$ |
| 0.9900 | $3.94 \times 10^{-2}$ | $3.97 \times 10^{-4}$ |
| 0.9990 | $3.99 \times 10^{-3}$ | $4.00 \times 10^{-6}$ |
| 0.9999 | $3.99 \times 10^{-4}$ | $4.00 \times 10^{-8}$ |

Figure 10:
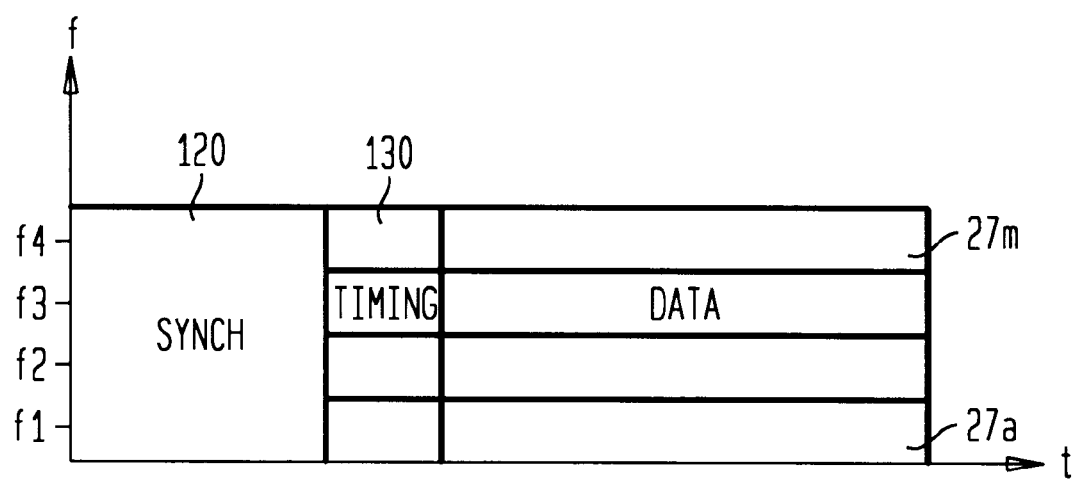
FIG. 10 showing frame synchronization across all clusters and utilizing the entire transmitted bandwidth.

As the clustered OFDM system is intended for wireless data packet transmission, frame or block synchronization between transmitter and receiver portions is necessary. As illustrated in FIG. 10, separate frame synchronization words 120 are transmitted simultaneously on all cluster antennas 60a–60M (FIG. 1) using the entire transmission bandwidth, resulting in independent fading. Four conventional correlator detectors (not shown) are used at the receiver with noncoherent combining. The advantages of this approach are: (1) using the full bandwidth provides more accurate timing and (2) simultaneous transmission on all clusters with separate frame synch words (pseudo-random number sequence) provides diversity in the synch signal, which is extremely important. As shown in FIG. 10, the synchronization is obtained at the expense of minimal training 130, for e.g., for carrier recovery.

Assuming N sub-channels, each of bandwidth 1/T and separated by 1/T, where T is the symbol interval for the individual sub-channels, and assuming no ISI and that the individual sub-channels are narrow enough so that the only effect of multipath is flat fading in each sub-channel, it is shown that the peak-to-average power ratio, PAP, for such a multicarrier signal is equal to N. For example, for 32 tones, PAP is 15 dB. The clustered OFDM system 10 of the invention reduces PAP since less tones are transmitted through a given amplifier. For the same total of 32 tones as above but with four antennas transmitting 8 tones each, PAP is reduced by 6 dB (PAP=9 dB). This translates into a factor of four reduction in the PAP seen by each amplifier, plus a factor of four reduction in the average power for an individual amplifier. Of course, four such amplifiers are required.

The combination of clustering and coding may provide some performance benefits since now more uncorrelated symbols are presented to the decoder making the coding more effective. An estimate of the benefits is given as follows:

In general, even though the multipath channel has been assumed flat across a given sub-channel, across the entire multicarrier signal bandwidth, the multipath channel is frequency selective. This means that, for any one realization of the multipath channel, some sub-channels will be good, that is, have sufficient received power to meet the bit error probability ($P_b$) objective, while others will be bad. Therefore, a reasonable measure of performance can be computed as follows: For a particular realization of the multipath channel, an equivalent SNR is computed for each sub-channel and the number of sub-channels meeting some SNR (or bit error probability $P_b$) objective is determined. The fading is assumed to be flat in each sub-channel, so that the received SNR in the $n^{th}$ sub-channel is $$SNR_{n,rec} = SNR_{P_b,AWGN} P_{margin} |H(f_n)|^2$$

where $|H(f_n)|^2$ represents the attenuation due to the flat fading on each sub-channel, $SNR_{P_b,AWGN}$ is that ratio required to achieve the target bit error probability $P_b$ in additive, white Gaussian noise (AWGN). $P_{margin}$ is called the fade margin and is the excess power provided above that required to meet the $P_b$ objective in AWGN. Then, by considering many multipath channel realizations, we can compute the number of times a given number of bad sub-channels occurs out of the total number of sub-channels. From this, we can also evaluate the benefits of coding.

Figure 6:
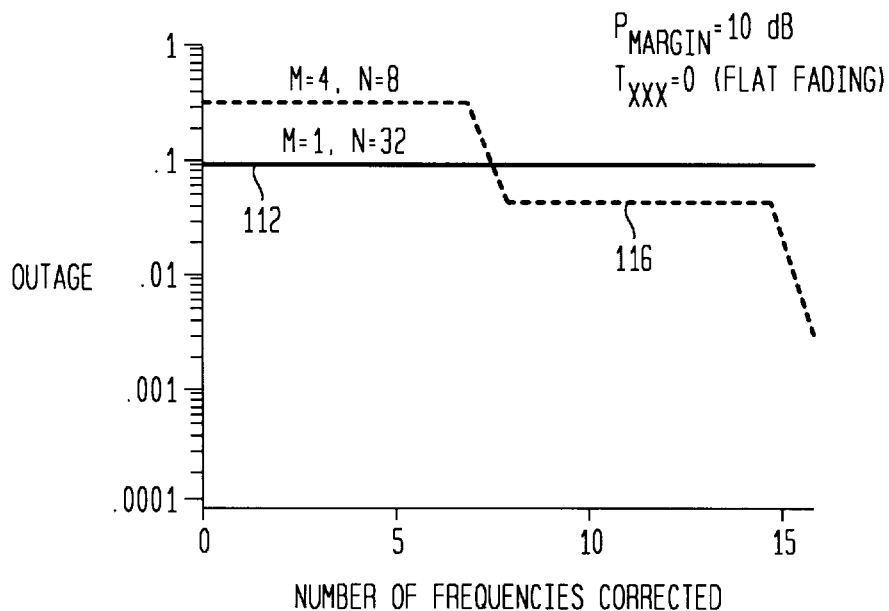
FIG. 6 is a diagram showing outages versus the number of frequencies which are being corrected in the decoder in the case of flat fading.
Figure 7:
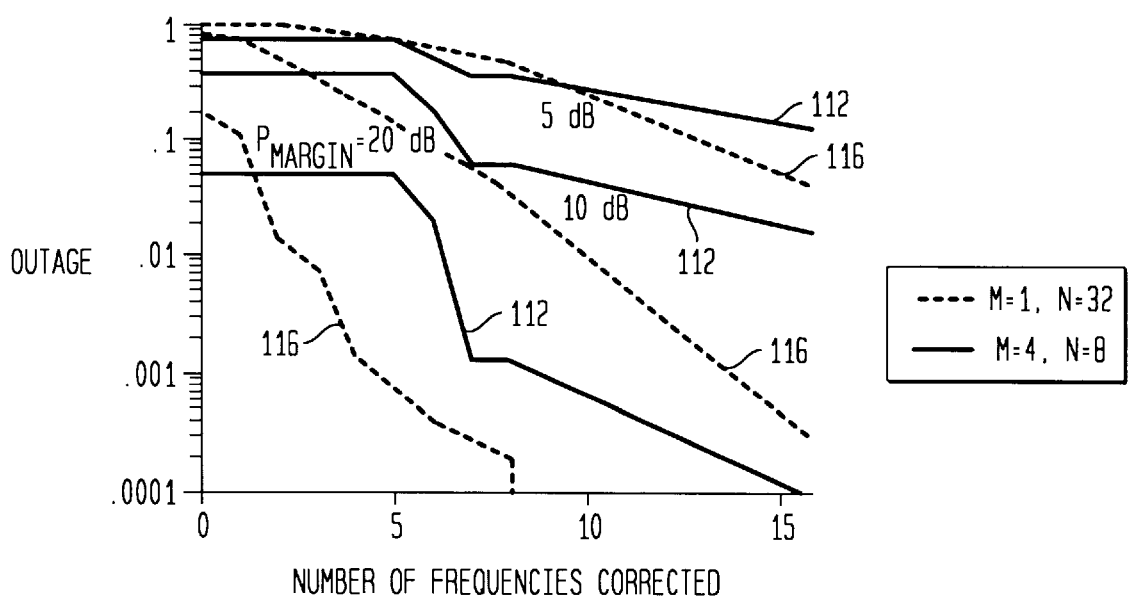
FIG. 7 is a diagram showing outages versus the number of frequencies which are being corrected in the decoder in the case of a two-ray power delay profile.
Figure 8:
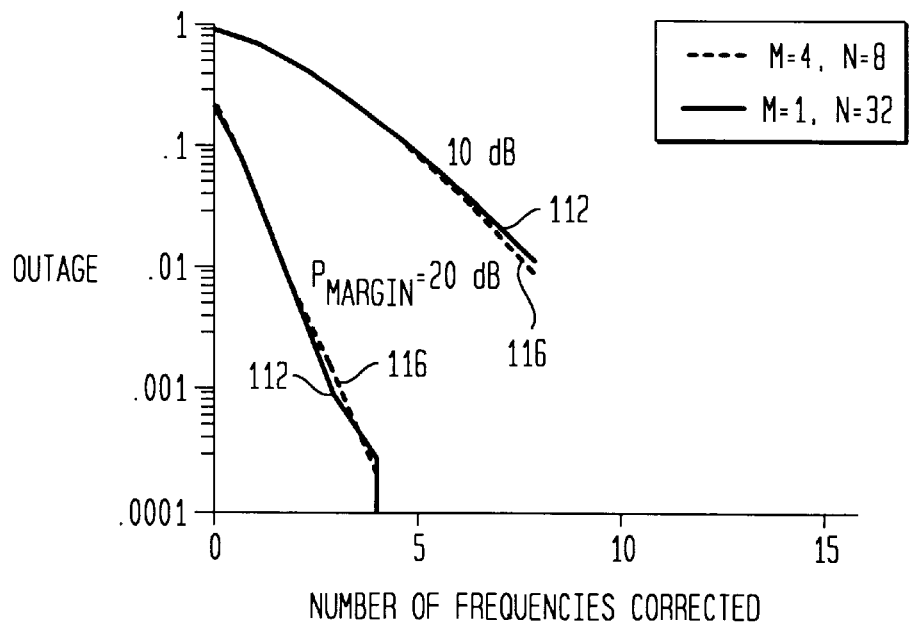
FIG. 8 is a diagram showing outages versus the number of frequencies which are being corrected in the decoder in the case of an exponential power delay profile.

If no coding is used, a clustered system (i.e., multiple transmit antennas) is worse than a non-clustered system (i.e., a single antenna). For no coding and zero delay spread (so the multipath channel is flat over the entire bandwidth on a given antenna), the probability that a given block is good (i.e., no sub-channels are bad) is simply $p = \exp(-1/P_{margin})$. Therefore, for a single antenna, the probability that the block is bad (the outage), is $P_{out,1} = 1-p$. Similarly, for M antennas, $P_{out,M} = 1-p^M > 1-p = P_{out,1}$. As an example, for 20-dB fade margin, p=0.99. Therefore, for one antenna, the outage is 0.01, while, for four antennas, the outage is 0.04. (More generally, $P_{out}$ (i good antennas and n-i bad antennas)=$[^n_i] p^i(1-p)^{n-i}$). On the other hand, with heavy to moderate coding the clustered approach can provide some advantage. To obtain an estimate of the benefits of coding, the number of bad sub-channels remaining after correcting some number of sub-channels is simply computed and then the outage is recomputed. FIG. 6 illustrates the comparison of the results of outage versus the number of frequencies being corrected in the decoder with flat fading on each antenna; FIG. 7 with two-ray power delay profile, and FIG. 8 with an exponential power delay profile. In each of these FIGS. 6–8, the outage is plotted versus the number of frequencies which are being corrected in the decoder. In FIGS. 7 and 8, the r.m.s. delay spread, $\tau_{rms}$ is chosen so that $\tau_{rms} R_{baud} = 0.1 \times N$ (N equals the number of tones). The target bit error probability is $P_b = 10^{-8}$ (The choice of target bit error probability $P_b$ is not crucial since the channel is basically "ON-OFF".) Results are shown in FIGS. 6–8 for different margins and two partitions: one antenna with 32 tones indicated as line 112, and four (4) antennas with eight (8) tones on each indicated as lines 116.

From the plots, the benefits of coding are apparent for either antenna/tone arrangement, especially when the delay spread is significant (or, equivalently, more potential frequency diversity). In particular, for a two-ray power delay profile, for a 1% target outage, a single antenna system with no coding requires about 27 dB of fade margin. However, if eight (8) frequencies can be corrected (for example, ½-rate Reed-Solomon code, with error correction, or a ¾-rate code with erasure correction), this outage can be achieved with only 17 dB. This is comparable to the improvement which would be obtained with ideal selection diversity. Of course, this is at the expense of reduced bandwidth efficiency. The exponential profile is much more benign and much less coding is needed, as shown in FIG. 8. Obviously, in a flat fading environment (FIG. 6), for a single antenna system, coding is not of much use since the 32 tones are either all good or all bad.

In addition, for low-bit-error probability situations, with moderate coding, the clustered approach can provide significant improvements in performance over the single-antenna approach. For example, in FIG. 7, with 20-dB of margin, more than an order of magnitude improvement in outage can be achieved over the single antenna system, line 116, if only four (4) frequencies are corrected. The improvements are less substantial for less margin (i.e., higher intrinsic outages) and are negligible for an exponential profile.

Figure 9:
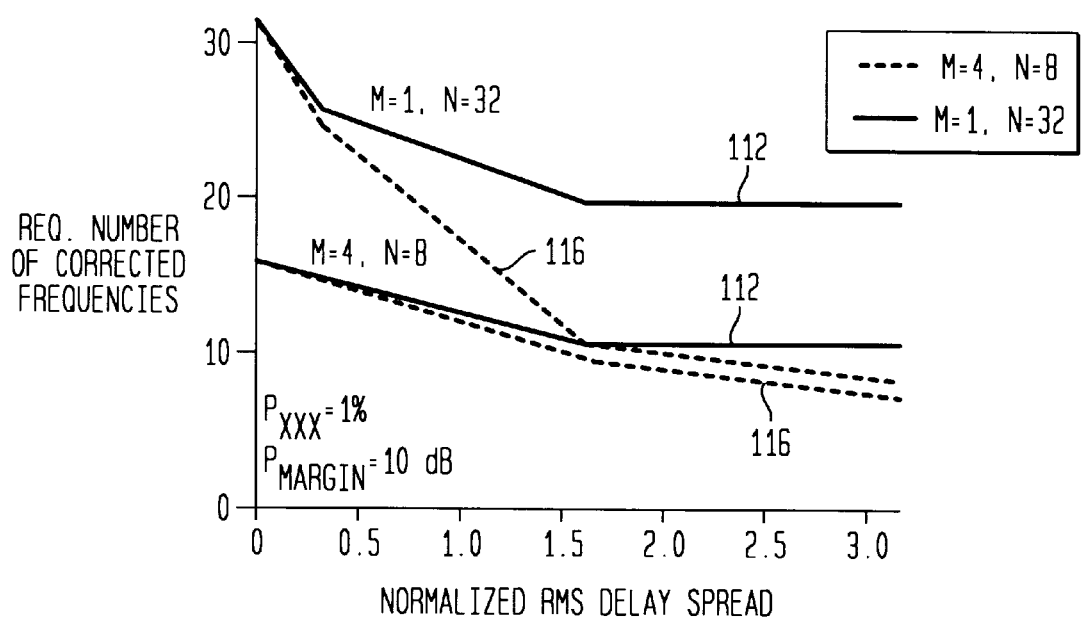
FIG. 9 is a diagram showing outages versus the number of frequencies which need to be corrected to achieve a 1% outage for a RMS delay spread.

FIG. 9 illustrates the number of frequencies which need to be corrected to achieve a 1% outage versus the normalized r.m.s. delay spread (i.e., $\tau_{rms} R_{baud}$). Results are shown in FIG. 9 for a 10-dB fade margin, two-ray and exponential power delay profiles, and the previously considered two partitions of antennas and tones (i.e., one antenna with 32 tones, indicated as line 112, and 4 antennas with 8 tones on each, indicated as lines 116). As expected, the larger delay spread environment provides more frequency diversity and, therefore, less coding is required to obtain the desired performance. In addition, the clustered approach is uniformly more efficient than the single-antenna configuration.

As discussed above, PAP of the multitone signal in each cluster 27a, . . . 27M can be further reduced by embedding the data sequence in a longer sequence (i.e., coding). This mapping can be implemented using a table look-up (PAP-ROM 35) where all of the "large-peak" sequences are not used. For example, an 8-tone signal (with QPSK on each tone) has a 9-dB PAP. By accepting a 12% overhead (i.e., one additional tone), we can reduce PAP to 3.6 dB. The table look-up approach can almost always reduce PAP to less than 4 dB with minimal overhead.

To obtain a rough estimate of the effect of the error propagation, assume that 8 tones are mapped into 9 tones and that 8 tones (16 bits) corresponds to two 8-bit Reed-Solomon code symbols (Galois Field (256)). Therefore, a single-bit error in transmission will cause two Reed-Solomon symbols to be incorrectly received. Since, to reduce the PAP, ¾ of the 18-bit sequences are not used, then about 25% of the time the error will go undetected—requiring four (4) parity symbols to correct. The rest of the time, an error will be detected (i.e., the received sequence is not in the valid set of received 18-bit sequences, and in erasure will be declared and corrected. In the more usual case, without the non-linear PAP coding, a single-bit error would cause only one Reed-Solomon symbol to be incorrectly received. This could be corrected either using 2 parity symbols or, if the error frequency can be flagged as bad, 1 erasure symbol.

In addition to the non-linear coding technique provided above for reducing PAP of the multicarrier signal in the transmitter, a simple alternative to reducing the PAP is to clip the signal before amplification and then filtering after clipping. The benefits are that clipping is scalable to a different number of antennas and sub-channels per antenna, clipping avoids look-up tables and the error propagation associated with non-linear coding, the number of transmitters could be reduced, and individual tones could be optimally assigned to a transmit antenna.

Assume M antennas with N sub-channels on each antenna. In general, for OFDM, intersymbol interference (ISI) can be eliminated by extending the symbol period, $T=1/\Delta f$ ($\Delta f$=sub-channel spacing), using a guard interval, $T_g$, equal to the time extent of the multipath channel. In addition, some number of guard frequencies, $F_g$, are necessary to minimize adjacent channel interference and to facilitate filtering. Including these inefficiencies as well as the inefficiencies caused by coding, the resulting bit rate is governed by equation (2) as follows:

$$R_b = 2 \times R_{PAP} \times R_{code} \times \frac{[(MN) - F_g]}{\frac{1}{\Delta f} + T_g} \quad (2)$$

where $R_{PAP}$ is the code rate for the non-linear PAP reduction code and $R_{code}$ is the rate of the forward-error-correction code. In equation (2), the packet efficiency which would include all of the overhead for training, have been ignored. If frequency and guard intervals which are 10% of the bandwidth and symbol period, respectively, are considered without forward error correction, efficiencies (i.e., $R_b/B_T$) on the order of 1.4–1.6 bits/sec Hz can be achieved.

The number of tones per cluster, N, is limited by the PAP to about five (5) through ten (10) to provide PAP reduction on the order of 7–10 dB. The number of transmitters (i.e., clusters), M, is upper-bounded by cost and power and lower-bounded by the desired diversity advantage with a good compromise choice being four (4). The tone spacing $\Delta f$ (i.e., the sub-channel bandwidth) must be large enough to accommodate the expected frequency offset, but small enough to avoid equalization. For a $\tau_{rms}$ delay spread of 150 nsec and a carrier frequency offset of 3–5 KHz, a tone spacing $\Delta f$ equal to 300–500 KHz should be adequate.

Given these limitations, a 7 tones per cluster implementation was considered with a Reed-Solomon code with Galois Field (64) but with a much smaller look-up table for the PAP reduction coding. In the following example taking M=4 and N=7, a total bandwidth, $B_T$, of about 11 MHZ is assumed. As an example,. In this instance, the sub-channel spacing will be 392.9 kHz with 2 guard tones and 300 nsec of guard interval, $R_b$=15.7 Mb/s×$R_{code}$. If M=4 clusters and N=9 tones are implemented, the resulting sub-channel spacing will be 305.6 kHz (i.e., $B_T$/MN) and a guard interval of 300 nsec (two times the r.m.s. delay spread), then $R_b$=16.9 Mb/s×$R_{code}$. However, the use of 9 tones (i.e., 18-bit sequences) requires a fairly large look-up table for the PAP reduction.

The parameters which are more amenable to implementation in the clustered OFDM communication system of the invention has been described using four antennae with 7 (or 9) tones transmitted over each. However, for a PCMCIA card implementation, as may be desired for a laptop computer application, only one or two antennas may be feasible. To accommodate these implementations, the flexibility and parallelism of multicarrier transmission may be exploited to provide, for instance, a terminal transmitting at a one-fourth bit rate using only a single cluster (antenna). In addition, in a hierarchical system architecture (i.e., where base stations are employed for access), the link could be asymmetric, i.e., the downlink transmission is at the highest rate, using all clusters, while the uplink is at the one-fourth bit rate. A hierarchical architecture would also facilitate transmit cluster switching and diversity reception at the base station to provide high performance with simple terminal equipment. Finally, terminals could transmit with a single antenna and full bandwidth at low power and reduce the number of transmitted tones while increasing power as the channel attenuation rises.

It should be understood that the preferred embodiments and examples described are for illustrative purposes only and are not to be construed as limiting the scope of the present invention which is properly delineated only in the appended claims.

We claim:

1. A multicarrier communication system for wireless transmission of blocks of data, each said block having a plurality of digital data symbols, said system comprising:

means for distributing said plurality of digital data symbols in each block over a plurality of clusters, each of said plurality of clusters capable of receiving one or more digital data symbols;

means for encoding said one or more digital data symbols in each of said plurality of clusters, said encoding means including means for applying non-linear coding to reduce peak-to-average power ratio in each sub-channel;

means for modulating said encoded one or more digital data symbols to produce a modulated signal capable of being transmitted over sub-channels associated with each respective cluster; and a transmitter for transmitting said modulated signal over said sub-channels.

2. The multicarrier communication system as claimed in claim 1, wherein said means for modulating said one or more digital data symbols includes means for providing OFDM modulation.

3. The multicarrier communication system as claimed in claim 1, wherein said digital data symbols are input to said distributing means at a first data rate, said distributing means distributing said plurality of digital data symbols at a second data rate less than said first data rate.

4. The multicarrier communication system as claimed in claim 1, wherein said means for distributing said plurality of digital data symbols over said second plurality of clusters includes a demultiplexer.

5. The multicarrier communication system as claimed in claim 1, further including a receiver for receiving said modulated signal transmitted by said plurality of clusters and demodulating said modulated signal.

6. The multicarrier communication system as claimed in claim 5, further including means located at said receiver for measuring frequency response of each sub-channel of said plurality of clusters, and means for providing feedback representing a frequency response characteristic of each transmission sub-channel to said transmitter.

7. The multicarrier communication system as claimed in claim 6, further including means for switching each said one or more digital data symbols to be transmitted to an optimum transmission sub-channel according to said frequency response of said transmission sub-channel.

8. The multicarrier communication system as claimed in claim 7, wherein said means for switching each said one or more digital data symbols includes said means for distributing said plurality of digital data symbols over said plurality of clusters.

9. The multicarrier communication system as claimed in claim 5, wherein said receiver includes a single demodulating receiver.

10. The multicarrier communication system as claimed in claim 5, wherein said receiver includes a plurality of demodulating receivers.

11. The multicarrier communication system as claimed in claim 1, further including means for synchronizing data for simultaneous transmission over all said sub-channels of said plurality of clusters to effect simultaneous transmission of data over an entire transmission bandwidth.

12. The multicarrier communication system as claimed in claim 11, wherein said data transmission is packetized, said one or more symbols including block synchronization tones.

13. The multicarrier communication system as claimed in claim 1 further including multiple antennas, each antenna corresponding to a data cluster.

14. A multicarrier communication system for wireless transmission of blocks of data, each said block having a plurality of digital data symbols, said system comprising:
   means for distributing said plurality of digital data symbols in each block over a plurality of clusters, each of said plurality of clusters capable of receiving one or more digital data symbols;
   means for encoding said one or more digital data symbols in each of said plurality of clusters;
   means for modulating said encoded one or more digital data symbols to produce a modulated signal capable of being transmitted over sub-channels associated with each respective cluster; and
   a transmitter for transmitting said modulated signal over said sub-channels;
   means for measuring frequency response characteristics of each sub-channel of said plurality of clusters, said means for measuring frequency response characteristic including means for providing feedback representing said frequency response characteristic of each transmission sub-channel to said transmitter; and,
   means for switching each said one or more symbols to be transmitted to an optimum transmission sub-channel according to said frequency response of said optimum transmission sub-channel.

15. The multicarrier communication system as claimed in claim 14, wherein said means for modulating said one or more digital data symbols includes means for providing OFDM modulation.

16. The multicarrier communication system as claimed in claim 14, wherein said means for encoding said one or more digital data symbols in each of said plurality of clusters includes means for applying non-linear coding to reduce a peak-to-average power ratio in each sub-channel.

17. The multicarrier communication system as claimed in claim 14, wherein said means for distributing said plurality of digital data symbols over said plurality of clusters includes a demultiplexer.

18. The multicarrier communication system as claimed in claim 14, wherein said means for switching each said one or more signals to be transmitted to an optimum transmission sub-channel includes said means for distributing said plurality of digital data symbols over said plurality of clusters.

19. The multicarrier communication system as claimed in claim 14, further including means for synchronizing data for simultaneous transmission over all said transmission sub-channels of said plurality of clusters to effect simultaneous transmission of data over an entire transmission bandwidth.

20. The multicarrier communication system as claimed in claim 19, wherein said data transmission is packetized, said data including one or more block synchronization tones.

21. The multicarrier communication system as claimed in claim 14, wherein said system includes a receiver for receiving said modulated signal transmitted by said plurality of clusters and demodulating said modulated signal.

22. The multicarrier communication system as claimed in claim 21, wherein said receiver includes said means for measuring frequency response characteristics of each transmission sub-channel of said plurality of clusters.

23. A multicarrier communication system for wireless transmission of blocks of data, each said block having a plurality of digital data symbols, said system comprising:
   means for distributing said plurality of digital data symbols in each block over a plurality of clusters, each of said plurality of clusters capable of receiving one or more digital data symbols;
   means for encoding said one or more digital data symbols in each of said plurality of clusters;
   means for modulating said encoded one or more digital data symbols to produce a modulated signal capable of being transmitted over sub-channels associated with each respective cluster; and,
   a transmitter for transmitting said modulated signal over said sub-channels; and,
   means for synchronizing data for simultaneous transmission over all said sub-channels of said plurality of clusters to effect simultaneous transmission of data over an entire transmission bandwidth.

24. The multicarrier communication system as claimed in claim 23, wherein said means for modulating said one or more digital data symbols includes means for providing OFDM modulation.

25. The multicarrier communication system as claimed in claim 23, wherein said data transmission is packetized, said data including one or more block synchronization tones.

26. The multicarrier communication system as claimed in claim 23, wherein said means for encoding said one or more digital data symbols in each of said plurality of clusters includes means for applying non-linear coding to reduce a peak-to-average power ratio in each sub-channel.

27. The multicarrier communication system as claimed in claim 23, wherein said means for distributing said plurality of digital data symbols over said plurality of clusters includes a demultiplexer.

28. The multicarrier communication system as claimed in claim 23, further including a receiver for receiving said modulated signal transmitted by said plurality of clusters and demodulating said modulated signal, said system further including means located at said receiver for measuring frequency response of each sub-channel of said plurality of clusters, and means for providing feedback representing a frequency response characteristic of each transmission sub-channel to said transmitter.

29. The multicarrier communication system as claimed in claim 28, further including means for switching each said one or more symbols to be transmitted to an optimum transmission sub-channel according to said frequency response of said transmission sub-channel.

30. The multicarrier communication system as claimed in claim 29, wherein said means for switching each said one or more symbols includes said means for distributing said plurality digital data symbols over said plurality of clusters.

31. A method for wireless transmission of data represented as one or more blocks containing a plurality of digital data symbols in each block, which are distributed over a plurality of clusters, said method comprising the steps of:
   a) measuring a frequency response characteristic of each transmission sub-channel of said plurality of clusters: and providing feedback representing said frequency response characteristic of each transmission sub-channel to a transmitter;
   b) distributing said plurality of digital data symbols over a plurality of clusters, each cluster capable of transmitting one or more digital data symbols, and switching each said one or more digital data symbols to be transmitted to an optimum transmission sub-channel according to said frequency response of said optimum transmission sub-channel;

c) encoding said one or more digital data symbols in each of said plurality of clusters.;

d) modulating said encoded one or more digital data symbols distributed to each cluster to produce a modulated signal for transmission over sub-channels associated with each said plurality of clusters; and, e) transmitting said modulated signal over each sub-channel of said plurality of clusters for receipt by a receiver.

32. The method for wireless transmission of data as claimed in claim 31, wherein said step of encoding said one or more digital data symbols includes the step of applying non-linear coding to reduce a peak-to-average power ratio in each channel.

33. The method for wireless transmission of data as claimed in claim 31, wherein said step of distributing said plurality of digital data symbols over said plurality of clusters further includes the step of demultiplexing said plurality of digital data symbols.

34. The multicarrier communication system for wireless transmission of data as claimed in claim 31, further including the step of synchronizing data for simultaneous transmission over all said sub-channels of said plurality of clusters to effect simultaneous transmission of data over an entire transmission bandwidth.

35. A multicarrier communication system for wireless transmission of blocks of data between a transmitter and a receiver, each said block having a quantity NM of digital data symbols, said system comprising:

means for distributing said NM digital data symbols in each block over M clusters, each said M clusters capable of receiving N digital data symbols;

means for encoding said N digital data symbols in each of said M clusters, said means for encoding said N digital data symbols in each of said M clusters including means for applying non-linear coding to reduce a peak-to-average power ratio in each sub-channel;

means located in each said cluster for providing OFDM modulation of said encoded N digital data symbols and to produce an OFDM signal capable of being transmitted over transmission sub-channels associate d with each respective cluster; and means for transmitting said OFDM signal over said sub-channels.

36. The multicarrier communication system as claimed in claim 35, wherein said receiver receives said modulated signal transmitted by said M clusters and demodulates said modulated signal.

37. The multicarrier communication system as claimed in claim 35, further including means located at said receiver for measuring frequency response of each sub-channel of said M clusters, and means for providing feedback representing a frequency response characteristic of each transmission sub-channel to said transmitting means.

38. The multicarrier communication system as claimed in claim 37, further including means for switching each said N digital data symbols to be transmitted to an optimum transmission sub-channel according to said frequency response of said transmission sub-channel.

39. The multicarrier communication system as claimed in claim 38, wherein said means for switching each said N digital data symbols includes said means for distributing said NM digital data symbols over said M clusters.

40. The multicarrier communication system as claimed in claim 35, further including means for synchronizing data for simultaneous transmission over all said sub-channels of said M clusters to effect simultaneous transmission of data over an entire transmission bandwidth.

41. The multicarrier communication system as claimed in claim 40, wherein said data transmission is packetized, said one or more symbols including block synchronization tones.

42. The multicarrier communication system as claimed in claim 35 further including M antennas.

* * * * *